United States Patent [19]

Staunton

[11] 4,244,207
[45] Jan. 13, 1981

[54] TEMPERATURE STANDARD

[75] Inventor: John J. J. Staunton, Oak Park, Ill.

[73] Assignee: The Perkin-Elmer Corporation, Norwalk, Conn.

[21] Appl. No.: 18,969

[22] Filed: Mar. 9, 1979

[51] Int. Cl.³ .............................................. G01K 15/00
[52] U.S. Cl. ....................................................... 73/1 F
[58] Field of Search ................................ 73/1 F; 62/3

[56] References Cited

U.S. PATENT DOCUMENTS

| 3,713,302 | 1/1973 | Reviel | 62/3 |
|---|---|---|---|
| 4,079,618 | 3/1978 | King | 62/3 |

FOREIGN PATENT DOCUMENTS 1098270 12/1965 United Kingdom ...................... 73/1 F

OTHER PUBLICATIONS

Natl. Bur. Standards Certificate, Standard Reference Material 1968 Gallium, Melting-Point Standard Jun. 1977.

YST Model 60 Gallium Temperature Standard Aug. 1978.

Mangum et al., editors, The Gallium Melting-Point Standard Jun. 1977.

Primary Examiner—S. Clement Swisher
Attorney, Agent, or Firm—Salvatore A. Giarratana; Edwin T. Grimes; John D. Crane

[57] ABSTRACT

An improved melting point temperature standard includes a well for receiving a temperature sensor to be calibrated. Surrounding the well is a cell with a crystalline material therein. A thermally conductive spacer contacts the outer cell walls. A thermal barrier contacts the spacer and a second thermally conductive member encircles the barrier. A heating/cooling element contacts the second thermally conducive member to apply heat or to cool it. Thermistors in the second thermally conducive member and the spacer are used by a control circuit to adjust the heat flow into the cell so that the crystalline material melts over a period of 7 to 8 hours making use of the temperature standard possible for many hours.

25 Claims, 4 Drawing Figures

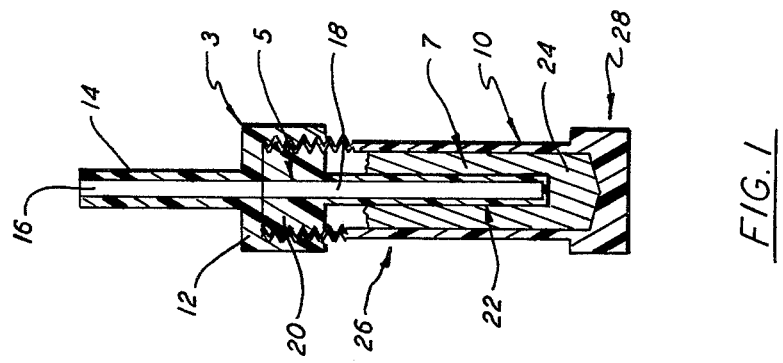
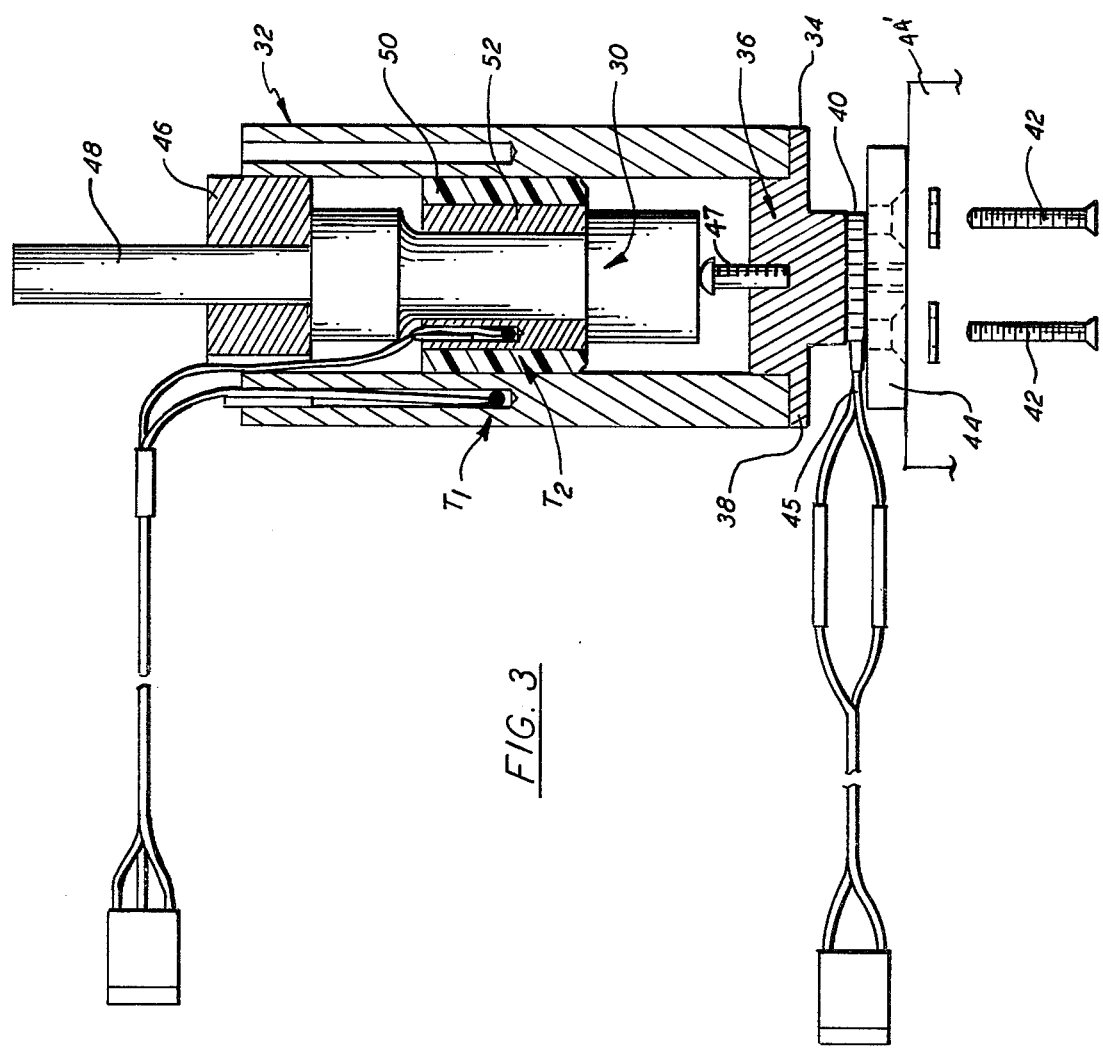

TEMPERATURE STANDARD

BACKGROUND OF THE INVENTION

The present invention relates generally to temperature standards and more particularly to an improved melting point temperature standard.

It is well known that when a crystalline substance melts, the change of state from solid to liquid requires the input of energy. During the melting process, the energy applied to the crystalline substance goes into producing the change of state rather than into raising the temperature of the substance. Accordingly, while melting continues, the temperature remains constant at the melting point for the crystalline material.

The fixed temperature of the crystalline material during melting can be used as a temperature standard. The best known example is the melting temperature of ice made from pure water which occurs at zero degrees Celsius. Since the melting point of other crystalline substances are at temperatures different from zero degrees Celsius, a number of such melting points may be used as a standard temperature check at temperatures other than zero degrees Celsius.

There has been a need for a temperature reference for use to check electronic, thermistor type temperature probes and the like used in clinical laboratories in the 25 to 37 degrees Celsius range. One such reference has become available with the development by the National Bureau of Standards of a gallium melting point temperature standard, designated as Standard Reference Material 1968. The measuring cell developed by the National Bureau of Standards consists of a plastic cell containing 25 grams of 99.99999 percent pure gallium metal surrounding a well into which a temperature probe can be inserted for calibration. The plastic cell has relatively massive ends with a thin walled central portion through which heat is introduced to melt the gallium. The melting point of gallium is certified by the National Bureau of Standards as 29.7723+0.0004 degrees Celsius (for convenience 29.77 degrees Celsius will be used hereinafter) for a typical standard. When the cell is located in a bath having a temperature slightly above the melting point so that the gallium melts slowly, the certified temperature can be maintained in the well until the gallium has melted. Once all the gallium has melted, it must be refrozen prior to using the cell for further calibration cycles.

The National Bureau of Standards cell must be raised to a temperature slightly above the gallium melt point in order to produce the reference temperature within the well. This can be achieved by immersing the cell in a temperature controlled bath, however, such a procedure does involve equipment that is not only bulky but also quite costly.

Therefore, it is an objective of the present invention to provide a means for utilizing a melting point cell as a standard which is small, relatively low in cost, requiring no adjustments and which will extend the useful length of the melting cycle over a normal working day without the use of a bulky/costly liquid bath.

It is still a further objective of the present invention to provide a melting point cell with a built-in means for rapidly refreezing the crystalline substance after the melting cycle so it can be repeated.

It is yet a further objective of the invention to provide an automatic and continuous indication of the state of the crystalline material in a melting point cell during the melting cycle whereby, when the gallium becomes completely melted and is no longer maintaining a proper reference temperature, a visual or other indication will apprise the user of that fact and, if desired, initiate the refreezing cycle automatically.

BRIEF DESCRIPTION OF THE INVENTION

The foregoing and other objects, advantages and features of the invention are achieved by the improved melting point standard of the present invention which includes a melting point cell having a crystalline material therein physically disposed around a well into which a temperature probe can be inserted. In thermal contact with the exterior walls of the cell and radially outward of the region of the crystalline material is a spacer of thermally conductive material having a thermistor embedded therein. Disposed radially outward of the spacer is a cylindrical tubular spacer or barrier. The barrier has a lower thermal conductivity than other elements of the system. An outer wall of thermally conductive material is disposed radially outward and in contact with the barrier. This body also has a thermistor embedded therein.

An electrical heating/cooling element is disposed in thermal contact with the outer wall of the assembly. The rate of heat flow into the melting point cell is monitored by the thermistors and electronic circuitry controls the rate of heat flow so that the crystalline material will completely melt over a period of approximately seven to eight hours. Thereafter, the heating/cooling element can be actuated so as to re-freeze the crystalline substance in the temperature standard cell.

BRIEF DESCRIPTION OF THE DRAWINGS

The foregoing and other objects, advantages and features of the present invention are described below in further detail in connection with the drawings which form a part of the disclosure wherein:

FIG. 1 is a cross section of a typical melting point cell;

FIG. 3 is a cross section of an assembly incorporating the cell of FIG. 1; and

DETAILED DESCRIPTION

Figure 2:
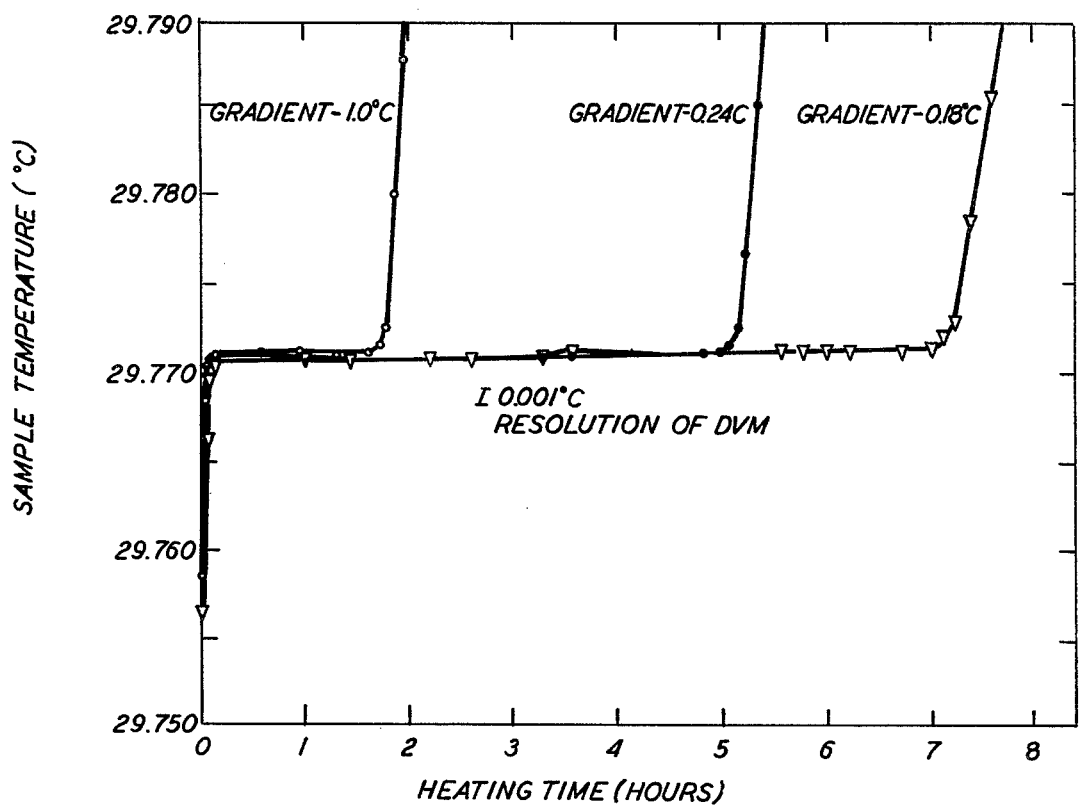
FIG. 2 illustrates the melting curves of a gallium melting point cell.

Referring first to FIG. 1, a cross-section is shown of the gallium melting point cell developed by the National Bureau of Standards. This cell has an outer container 10 which is typically made of Teflon. Disposed at the upper end of the container 10 is a cap 12 which has a tubular neck portion 14 having a centrally located opening 16 extending therethrough and communicating with the opening 18 which passes through the plug 20. The plug 20 is inserted into the upper end of the container 10 and has an extension 22 which projects downwardly into the central portion of the container 10. The openings 16 and 18 provide a passage for receiving temperature probes which are to be calibrated by the temperature standard.

The extension 22 projects downwardly into a mass of gallium 24 which almost completely fills the area bounded by the walls of container 10. At temperatures below 29.77° C., the gallium is solid, in which condition the gallium expands approximately 3.2% in volume. For this reason, the container 10 is partially filled and made of a yieldable material so as to accommodate the difference in volume occupied by the gallium between its solid and liquid states. Should gallium be "frozen" in a container accommodating only the volume of the gallium in liquid state, the solid state gallium would be under significant pressure which would tend to depress the melting temperature thereof, thereby making the cell inaccurate as a temperature standard.

It is desirable to provide heat energy uniformly and radially to the gallium to provide an even rate of melting within the cell. In order to accomplish this, the cell itself is made of a thin-waisted design with the central portion, indicated generally at 26, having significantly thinner walls than the bottom portion, indicated generally at 28. By making the bottom portion 28 larger, heat flow in this region is retarded. With such a structure immersed in a liquid bath at a temperature greater than 29.8° C., the gallium melts evenly, and the temperature in the well accurately remains at the melting point until the gallium is itself completely melted.

It is desirable to maintain the melting condition for an extended period of time, thereby allowing the standard to be utilized for calibration purposes for such extended period of time. To accomplish this objective, the rate of heat transfer into the cell must be controlled accurately and kept to a low value. FIG. 2 illustrates how the rate and hence extension of the melting time are associated with the gradient or difference of temperature between the inside of the cell and its outside surroundings. To extend the melting time over a 7-8 hour period, for instance, this gradient is typically 0.18° C. Obviously, the surrounding temperature must be very accurately controlled to maintain this very small temperature difference. As indicated above, it is a feature of this invention to accomplish the maintaining of such a small temperature difference.

Referring now to FIG. 3 which illustrates the preferred embodiment of the present invention, the assembly contains a gallium melting point cell, indicated generally at 30, of the type described above and which was formerly immersed in a liquid bath to provide the desired temperature gradient for melting the gallium. The approach adopted by the preferred embodiment, however, provides a much more precise control of heat flow into the cell and, therefore, the melting time for the gallium is more easily extended than by utilizing a liquid bath.

The assembly of FIG. 3 includes an outer shell 32 which comprises a heavy-bodied tube made of a metal of high thermal conductivity, such as aluminum. The shell 32 is closed at its bottom by a plug 34, having a central portion indicated generally at 36 which has an outer diameter small enough to fit into the shell 32. The plug 45 also has a radially extending flange portion 38, which overlies the bottom of the shell 32. The plug 34 is also preferably made of a high thermal conductivity metal such as aluminum.

The bottom of the plug 34 is maintained in intimate thermal contact with a thermo-electric Peltier device 40 by clamp screws 42, which pass through a base plate 44, the Peltier device 40, and into threaded holes in the plug 34. A thermally conductive grease or heatsink compound is also used as an interface at each contacting surface in the assembly to facilitate heat flow across each interface. The base plate 44 is further affixed to a massive metal heatsink 44' which is utilized to remove heat from the Peltier device 40 and hence the cell 30 when the gallium is being re-frozen.

The Peltier device 40 is connected to an external power source (not shown) by an electrical cable 45. When current flows through the Peltier device 40 in one direction, its upper surface becomes hot and its lower surface becomes cold. When the current flows in the opposite direction, the upper surface becomes cold and the lower surface becomes hot. Accordingly, the Peltier device can easily be used to either remove heat or introduce heat into the shell 32 as a function of the direction of current flow therethrough.

As indicated earlier, it is desirable that heat flow into the melting point cell be primarily concentrated into the thin walled central region, however, the remainder of the cell 30 must be in a region of substantially the same outside temperature to avoid temperature gradients which could cause error. Enclosure of the cell 30 in the massive cavity provided by the outer shell 32 accomplishes this condition. The cavity is closed at the top by a plug 46 which has a centrally disposed aperture therethrough for receiving the elongated neck portion 48 of the melting point cell 30.

The cell 30 is positioned vertically inside the shell 32 by a screw 47 which is screwed into a threaded hole in the upper surface of the plug 34. The head of the screw 47 is rounded to minimize the contact area with the massive base of the cell 30 thus minimizing heat flow from the plug 34 into the cell 30 via the screw 47. A material of high thermal resistance may also be employed between the screw 47 and the cell 30 to further reduce heat flow into the cell 30 from the screw 47.

To transfer heat from the cylindrical shell 32 to the melting point cell 30, a thermal bridge is used. In one form, the bridge may be made of a thermally conductive member in thermal contact with the inner surface of the shell 32 and the outer surface of the cell 30 in the region of its thin walled central portion. In its preferred form, the thermal bridge comprises a hollow cylindrical spacer or "barrier" 50 made of a thermally resistive material having a substantially uniform conductivity K such as unfilled polycarbonate or the like. The outer surface of the spacer 50 is in thermal contact with the inner surface of the shell 32. Disposed radially inward of the spacer 50 is another tubular spacer 52 made of a thermally conductive material such as aluminum. This spacer is split longitudinally into two halves to permit assembly adjacent the thin walled portion of the cell 30 as well as to be yieldable to prevent its rigidly embracing the gallium cell, thus causing possible error-producing pressure when the gallium is frozen. The interfaces between these bridging members, the tubular spacer 52 and the tubular spacer 50, which are loosely fitted, are preferably filled with a resilient, thermally conductive RTV silicone rubber which gives good heat transfer while supporting the cell in a yielding, non-rigid fashion.

In operation, the tubular spacer 52 is maintained at about 0.18° C. above the cell temperature of 29.77° C. At this temperature, the duration of the melting cycle will be in the order of 7-8 hours. The heat flow rate accordingly, is very small and is approximately equal to 0.06 Watts.

In order to accomplish this low heat flow rate, the temperature of the spacer 52 must be precisely controlled. To accomplish this, a thermistor sensor $T_1$ is imbedded in the wall of the shell 32 at a position radially outward of the thin-walled portion of the melting point cell 30. A second thermistor sensor $T_2$ is imbedded in the wall of the tubular spacer 52. These sensors are connected to a control circuit which is described below in greater detail and is utilized to control the rate of heat flow into the melting point cell 30.

With respect to operating the arrangement shown in FIG. 3, it has been found best for prompt heat-up and for control without overshooting or swinging about the temperature control point to use the sensor $T_1$ in the shell 32 to establish a fixed temperature in the neighborhood of 0.5° to 1.0° C. higher than the temperature desired at the outside wall of the melting point cell, thus developing a temperature drop of about 0.3° to 0.8° C. across the barrier 50.

An alternative configuration of the arrangement of FIG. 3 is to eliminate the barrier 50 and make the tubular spacer 52 thick enough to bridge the gap between the shell 32 and the outer walls of the melting point cell 30. In this configuration, control of the temperature requires only one thermistor being imbedded either in the spacer 52 or in the shell 32 to monitor the temperature of the cell and maintain it at the desired gradient, for instance 0.18° C. above 29.77° C. Such a configuration, however, would require the user to know the operating time to assure himself that the gallium in the melting point cell had not become entirely melted, as no automatic circuit is available to the gallium melting. An alternative approach is to check to see whether raising the controlled temperature of the shell 32 causes the temperature within the melting point cell to rise or to remain constant. In the latter case, the gallium is not melted and the test temperature is not in error.

This awkward and time-consuming test to determine whether the gallium is melted is obviated by the automatic, self-monitoring feature of the invention. This continuous self-monitoring provides an indicator light which typically remains lit as long as there is gallium in its unmelted state but goes out when the gallium becomes completely melted. It is clear that if a sensor could be installed inside the gallium cell to monitor the temperature, it could easily sense the rise of temperature accompanying the end of the melting cycle and operate as an indicator or alarm that the standard was no longer accurate. However, from the design as indicated already, the region of the gallium is not normally accessible without interfering with the thermometer probe or the like being tested. The arrangement according to the present invention, however, measures the rate of heat flow into the cell and uses this rate to control the indicator.

As indicated earlier, the spacer 50 is made of a thermally resistive material, such as an unfilled polycarbonate having a constant thermal conductivity K. The function of the spacer 50 is to produce a temperature gradient due to its lower thermal conductivity as heat flows from the shell 32 toward the melting point cell 30. In typical structures, the cell temperature is 29.77° C., the temperature of the inner wall of the spacer 52 is 0.18° C. higher or 29.95° C., and the temperature drop across the barrier for this low rate of heat flow is 0.3° C., giving the temperature of the internal wall of shell 32 of 30.25° C. The temperature of the shell 32 is controlled by an electronic controller circuit to within 0.02° C., which will cause the circuit to maintain the above gradients. So long as an 0.3° C. temperature drop is maintained across the barrier 50, the control circuitry is operative to detect this temperature difference at the thermistors $T_1$ and $T_2$ and act to keep an indicator lighted to advise the operator that the gallium is not completely melted.

When the gallium becomes completely melted, the temperature will start to rise because the heat inflow is no longer expended in overcoming the heat of fusion, i.e., in changing the state of the gallium from solid to liquid. The temperature of the gallium will rise, but, since the shell temperature is controlled and remains fixed, the rate of heat flow will drop as the temperature of the gallium gradually rises. When the gallium reaches the shell wall temperature, as indicated by the thermistor $T_1$, the heat flow becomes substantially zero (neglecting heat losses). Accordingly, the difference in temperature as indicated by thermistors $T_2$ and $T_1$ drops as the heat flow rate drops, and the indicator light will go out. Those with skill in the art will recognize that the larger the original difference or drop in temperature across the barrier 50, the more sensitive will be the indication of the end of the melting cycle. However, making this drop too large does give rise to some disadvantages. Namely, more insulation will be required to reduce the heat loss from the shell 32 and a spacer 50 of higher thermal resistance is also needed.

In order to minimize temperature gradients and heat loss, it has been found advisable to surround the cell assembly as shown in FIG. 3 with an inch or more of a polyurethane foam or equivalent insulating material (not shown). Absent such insulation, the heat loss may exceed the input to the cell for melting the gallium. Even more seriously, the heat to be supplied by the Peltier unit would not drop to 0 when the gallium became melted and would be at a level determined in part by the ambient temperature. This would make the temperature of thermistor $T_1$ offset either plus or minus from the proper control temperature to supply the heat loss, thus making action of the indicator less clear. With insulation as described, the operation is substantially unaffected by ambient temperature over a range at least from 15° to 35° C., even though the Peltier device is heating when ambient temperatures are below 30° C. and cooling at temperatures above 30° C., while properly setting the wall temperature of the shell 32 at thermistor $T_1$.

Figure 4:
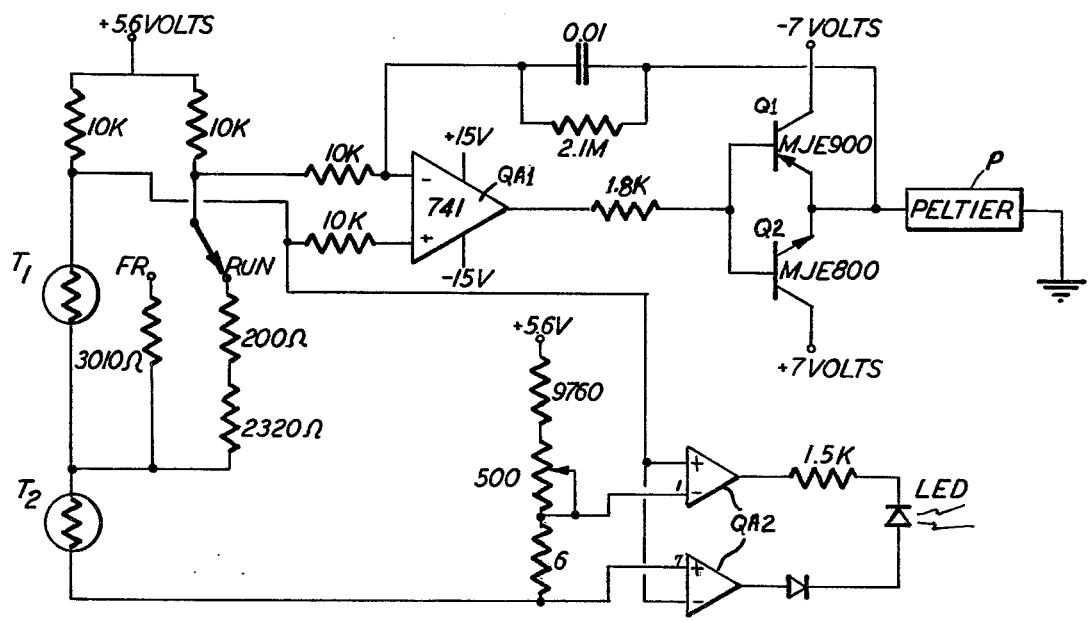
FIG. 4 illustrates a typical electrical circuit for controlling the operation of the melting point cell of the invention.

FIG. 4 illustrates the preferred embodiment of a controller circuit for operating the melting point cell shown in FIG. 3, however, it is typical of other circuit designs which those of skill in the art may easily develop. The function of this circuit should be readily understood by those skilled in the art. The thermistor $T_1$ monitors the temperature in the shell 32. Its voltage drop is compared with a preset voltage drop in the "RUN" leg of a bridge circuit which forms the input to the differential amplifier QA1 which is wired as a comparator. QA1 is utilized to control the power transistors Q1 and Q2 to cause the Peltier device P to either heat or cool as required with a positive output from QA1 causing heating and negative output causing cooling. The second thermistor $T_2$ is in the indicator circuit where its voltage drop, when equal to that of $T_1$, biases the amplifier pair QA2 into its "window" where the lamp L (a light emitting diode) is on. Any increase or decrease of the voltage across thermistor $T_2$ outside of the limits set by the drop across the 6 ohm resistor coupled between pins 1 and 7 of the amplifier pair QA2 causes the lamp L to be extinguished. The light will become extinguished whenever the crystalline material in the melting point cell is completely melted.

It is apparent to those of skill in the art to which the invention pertains that alternative control circuits can be devised to accomplish the same function and/or control of other types of heating or cooling devices and other types of indicators or alarms or switching devices. It will also be realized that the circuit can be modified to initiate refreezing of the crystalline substance in the melting point cell once the crystalline material in the cell is completely melted.

In the circuit shown, the re-freezing function is accomplished by manual switching of the switch to the position labeled "FR" (freeze position) which establishes a twenty degree C. control temperature at the Peltier device which cools the gallium rapidly to below its freezing point. The twenty degree control temperature is purely arbitrary as other temperatures may be selected if so desired so long as the temperature is below the freezing point of the gallium inside the melting point cell.

It should also be apparent to those of skill in the art that a similar circuit operating in a similar manner can be used for control of a melting point cell containing water/ice as a melting point standard for the temperature zero degrees Celsius. The circuit parameters and the Peltier cooling device will have to be selected around zero degrees C. but the general structure of the melting point cell and the indicator/control circuitry will remain the same as has already been described for the gallium melting point cell. The principles of the invention are easily extended to high temperature melting point cells where a restive heating element could be used with ambient temperature being effective for cooling the crystalline substance below its refreezing point. In such a confuguration, other sensors such as thermocouples or platinum sensors could be used as they are more suitable for measuring high temperatures than are themistors. Furthermore, the control and indicator principles hereintaught can be extended to larger or smaller standard temperature references as well. The foregoing and other changes will be readily apparent to those of skill in the art and can easily be made without departing from the spirit and scope of the invention as defined in the following claims.

What is claimed is:

1. A melting point cell for calibrating a temperature measuring device comprising:
    a body for containing a crystalline material which melts at a known temperature, said body including a passage for receiving the temperature measuring device and disposing it, during calibration, closely adjacent said crystalline substance;
    a first thermally conductive member in thermal contact with at least a portion of the exterior of said body;
    a second thermally conductive member surrounding said body and said first thermally conductive member;
    a thermally resistive material disposed between and in thermal contact with said first and said second thermally conductive member; and
    means to control the temperature of said second thermally conductive member so that the rate of heat flow into said body is at a desired rate.

2. The melting point cell of claim 1 additionally including means to measure temperature in said first thermally conductive member and means to measure temperature in said second thermally conductive member.

3. The melting point cell of claim 2 wherein each means to measure comprises a thermistor.

4. The melting point cell of claim 1 wherein said body containing a crystalline material is confined by a yieldable material which will expand to accommodate the expanded physical volume of the crystalline material in its solid state without placing pressure on the crystalline material which would affect the melting point of the crystalline material.

5. The melting point cell of claim 1 wherein said thermally resistive material comprises a material having the heat transfer characteristics of an unfilled polycarbonate.

6. The melting point cell of claim 1 wherein said crystalline material comprises substantially pure gallium.

7. The melting point cell of claim 1 wherein said means to control the temperature of said second thermally conductive member includes a Peltier device in thermal contact with said second thermally conductive member.

8. The melting point cell of claim 1 including means responsive to the temperature measured in said first and said second thermally conductive member to produce an indication when the difference in temperature between said first and said second thermally conductive body is less than a pre-selected temperature difference.

9. The melting point cell of claim 8 additionally including means responsive to said indication to cause said means to control the temperature to withdraw heat from said body for containing said crystalline material to cause said crystalline material to return to its solid state.

10. The melting point cell of claim 7 wherein said Peltier device is thermally coupled to a heat sink to provide a large surface area for dissipating excess heat.

11. A melting point cell for calibrating a temperature measuring device comprising, in combination:
    a closed body having a crystalline material enclosed therein, said closed body being made of a yieldable material permitting it to expand and contract as the crystalline material contained therein changes between its liquid and its solid states, said closed body having a well therein for receiving and positioning a temperature measuring device so that said crystalline material is closely adjacent the temperature measuring device;
    a first thermally conductive member in thermal contact with said closed body, said first thermally conductive member being shaped to permit said closed body to expand or contract while thermal contact is maintained between said closed body and said first thermally conductive member;
    a second thermally conductive member disposed around and in spaced relation with said closed body, said second thermally conductive body being shaped to permit access to said well by a temperature measuring device;
    a first temperature sensor disposed within said first thermally conductive member to measure the temperature of said first thermally conductive member;
    a second temperature sensor disposed within said second thermally conductive member to measure the temperature of said second thermally conductive member; and
    means to control the temperature of said second thermally conductive member to maintain a selected temperature difference between said first thermally conductive member and said second thermally conductive member.

12. The melting point cell of claim 11 additionally including a thermally resistive material disposed between and in thermal contact with said first and said second thermally conductive member.

13. The melting point cell of claim 11 wherein said temperature control means is selectively operable to either heat or cool said second thermally conductive member.

14. The melting point cell of claim 11 wherein said crystalline material is substantially pure gallium.

15. The melting point cell of claim 13 wherein said temperature control means additionally responds to a temperature difference, between the temperature of said first thermally conductive member and said second thermally conductive member, below a given difference by cooling said second thermally conductive member.

16. The melting point cell of claim 11 additionally including indicator means responsive to the temperature difference between said first thermally conductive member and said second thermally conductive member to provide an indication when the temperature difference between said first thermally conductive member and said second thermally conductive member falls below a pre-selected temperature difference.

17. The melting point cell of claim 13 wherein said means to control temperature includes a heat sink to dissipate the heat removed from said second thermally conductive member during cooling thereof.

18. The melting point cell of claim 11 wherein said means to control temperature includes a Peltier device.

19. A method of detecting completion of the melting process within a melting point cell comprising the steps of:
measuring the temperature at a first position along the heat flow path into the melting point cell;
measuring the temperature at a second portion along the heat flow path into the melting point cell;
determining the difference between the two measured temperatures; and
determining when said difference is less than predetermined value.

20. The method of claim 19 additionally including interposing a thermally resistive means between said first and said second position.

21. The method of claim 19 additionally including setting an indication when said difference falls below said predetermined value.

22. The method of claim 19 or 21 additionally including the step of cooling the melting point cell after said difference is less than said predetermined value.

23. A melting point cell for calibrating a temperature measuring device comprising, in combination:
a body for containing crystaline material which melts at a known temperature, said body including a passage for receiving the temperature measuring device and disposing it, during calibration, closely adjacent that crystalline material;
a thermally conductive member in thermal contact with at least a portion of the exterior of said body;
means to control the temperature of said thermally conductive member so that the rate of heat flow into said body is at a desired rate; and
said temperature control means includes means to measure temperature in said thermally conductive member.

24. The melting point cell of claim 23 wherein said thermally conductive member is yieldable to accommodate the expanded physical volume of the crystalline material in its solid state without placing pressure on the crystalline material which would affect the melting point of the crystalline material.

25. The melting point cell of claim 23 wherein said means to control the temperature of said thermally conductive member includes a Peltier device in thermal contact with said thermally conductive member.

* * * * *